United States Patent [19]

Koschinat

[11] Patent Number: 4,932,725
[45] Date of Patent: Jun. 12, 1990

[54] MOUNTING DEVICE FOR A WHEEL CAP OR A MAGNET WHEEL FOR SENSING ANTI-SKID SYSTEMS ON THE WHEEL HUB OF A VEHICLE WHEEL

[75] Inventor: B. Hubert Koschinat, Hösbach-Winzenhohl, Fed. Rep. of Germany

[73] Assignee: Otto Sauer Achsenfabrik Keilberg, Bessenbach-Keilberg, Fed. Rep. of Germany

[21] Appl. No.: 242,411

[22] Filed: Sep. 9, 1988

[30] Foreign Application Priority Data

Sep. 9, 1987 [DE] Fed. Rep. of Germany ....... 3730184

[51] Int. Cl.$^5$ .......................... B60B 7/06; B60T 8/32
[52] U.S. Cl. .................................. 303/1; 188/181 A; 277/177
[58] Field of Search ...................... 188/181 A, 181 R; 303/1; 277/173, 177, 167.5

[56] References Cited

U.S. PATENT DOCUMENTS

| | | | |
|---|---|---|---|
| 3,598,450 | 8/1971 | Brown | 301/108 A |
| 4,453,698 | 6/1984 | DeFrees | 277/177 |
| 4,544,167 | 10/1985 | Giroux | 277/177 |
| 4,602,705 | 7/1986 | Farr et al. | 188/181 A X |
| 4,725,102 | 2/1988 | Ando et al. | 188/181 A X |

FOREIGN PATENT DOCUMENTS

| | | |
|---|---|---|
| 666703 | 10/1938 | Fed. Rep. of Germany . |
| 8534939.9 | 4/1986 | Fed. Rep. of Germany . |
| 1580701 | 11/1967 | France . |

*Primary Examiner*—Andres Kashnikow
*Assistant Examiner*—Matthew C. Graham
*Attorney, Agent, or Firm*—Wenderoth, Lind & Ponack

[57] ABSTRACT

A mounting device for a wheel cap or a magnet wheel for sensing anti-skid systems on a wheel hub of a vehicle, creates a secure seat and greater ease of mountability and dismountability on the wheel hub by having on its outer end section a circumferential groove to receive a packing ring. The end section of the wheel cap or of the magnet wheel on the side of the wheel hub has a circumferential groove facing the circumferential groove of the wheel hub, with which groove the end section of the wheel cap or of the magnet wheel snaps by means of axially pushing over the packing ring in the circumferential groove of the wheel hub.

7 Claims, 3 Drawing Sheets

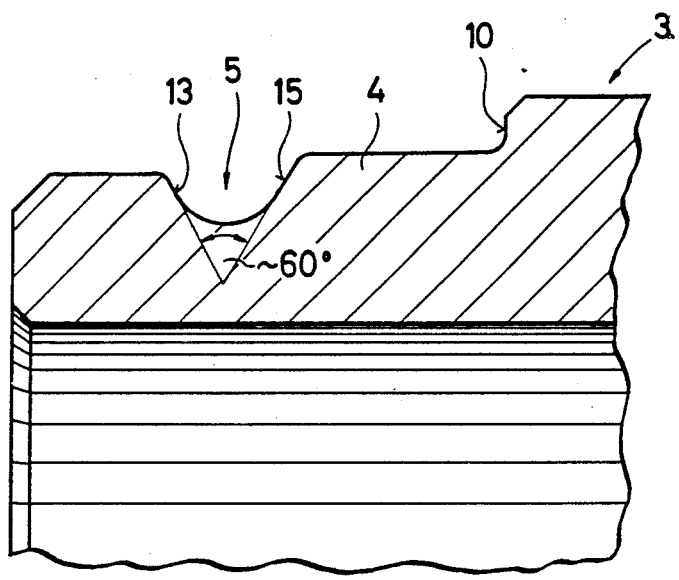
FIG.5
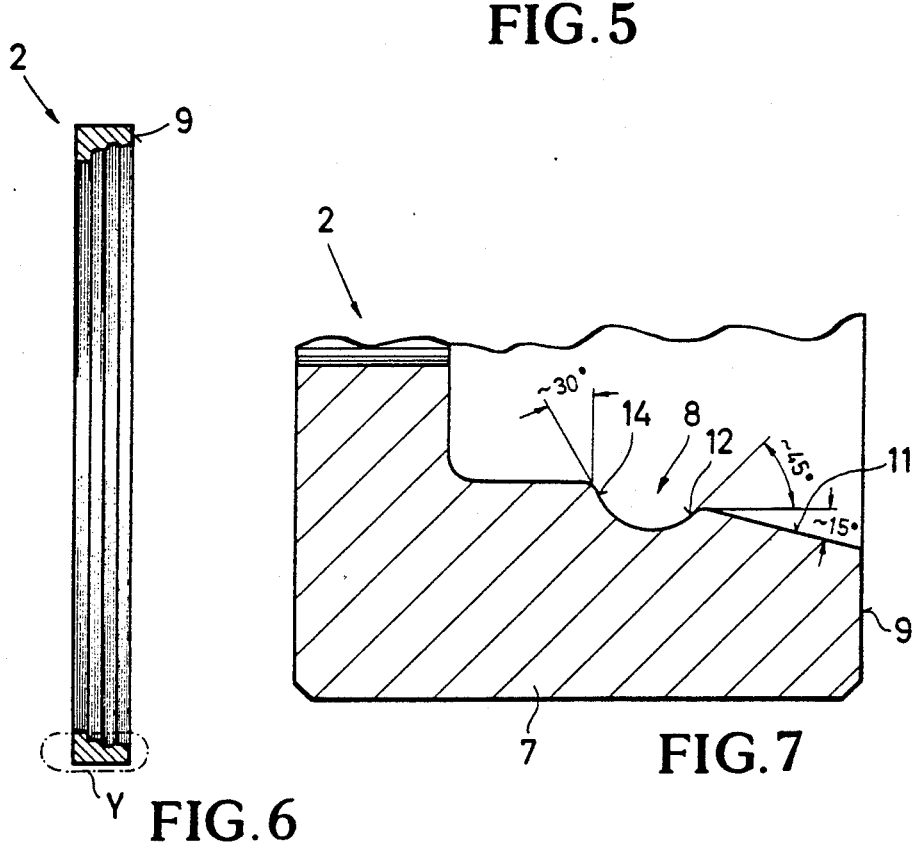
FIG.6
FIG.7

MOUNTING DEVICE FOR A WHEEL CAP OR A MAGNET WHEEL FOR SENSING ANTI-SKID SYSTEMS ON THE WHEEL HUB OF A VEHICLE WHEEL

BACKGROUND OF THE INVENTION

1. Field of the Invention

The invention relates to a mounting device for a wheel cap or a magnet wheel for sensing anti-skid systems on the wheel cap of a vehicle wheel, in particular of trucks and their trailers.

2. Description of the Prior Art

In known mounting devices of this type flanges, which are connected by means of several screws, are used on the wheel cap or the wheel hub. This solution is expensive from a constructive point of view. Mounting and dismounting is time-consuming. Furthermore, in oil-lubricated wheel bearings, special measures must be taken for sealing. Mounting devices of the aforementioned type also exist in which, for example, the wheel cap, provided with an outer thread, is screwed into the internal thread on the wheel hub. However, temperature fluctuations, combined with the centrifugal forces that arise, can result in the hub cap, which has been mounted in this manner, disconnecting itself unintentionally. In addition to this, it is difficult to dismount when said cap is securely mounted e.g. by tightening the cap hub in a warm state. This kind of mounting is also relatively expensive due to the threading.

Magnet wheels for sensing anti-skid systems are normally mounted between the magnet wheel itself and the wheel hub by means of precisely machined seats. This requires a high-production capability. Furthermore, this machine seat is no longer guaranteed if the wheel hub, as is usually the case, already receives during its manufacture the machined seat for the magnet wheel; the brake, however, is to be retro-fitted with the anti-skid system after the vehicle has been used for a period of time.

SUMMARY

Starting from this point, the object of the present invention is to propose a mounting device of the generic type, which can be manufactured at a low cost, in which, despite the speed and ease with which the wheel cap or magnet wheel can be mounted or dismounted, prevents said wheel cap or magnet wheel from a self-disconnect from the wheel hub and a seal primarily between the wheel cap and the wheel hub. This problem is solved by the invention essentially in that the wheel hub has a circumferential groove on its outer end section for receiving the packing ring and that the end section of the wheel cap or the magnet wheel on the wheel hub side has a circumferential groove facing the circumferential groove of the wheel hub, with said circumferential groove the end section of the wheel cap or of the magnet wheel snaps in the circumferential groove of the wheel hub by pushing it on axially. In this solution which is simple to construct, the wheel cap or the magnet wheel required for the anti-skid system is simply forced on the wheel hub. With the aid of the packing ring, which is snapped into the assigned circumferential grooves, the two components are secured in position and yet they can be readily mounted and dismounted in such a manner that they form a seal.

Preferably the wheel cap or the magnet wheel in the snapped-on position abuts with its face on the side of the wheel hub a shoulder of the wheel hub. Thus the seat of the wheel cap or the magnet wheel at the wheel hub is further stabilized. To dismount the wheel cap or the magnet wheel from the wheel hub, the interface between the face and shoulder can be flattened off or slotted for a tool such as a screw driver to engage, thus facilitating the dismounting of the wheel cap or the magnet wheel.

The circumferential groove in which the packing ring is to be permanently received—thus either the circumferential groove of the wheel hub or the circumferential groove of the wheel cap or of the magnet wheel—has preferably a groove root, which is essentially symmetrical to the median plane of the groove. Particularly in this case it is advantageous if in the case of the circumferential groove into which the packing ring is to snap only after the wheel cap or the magnet wheel has been pushed on the wheel hub—thus either with the circumferential groove of the wheel cap or of the magnet wheel or of the circumferential groove of the wheel hub—the axial outer edge of the circumferential groove in question is designed flatter and lower than the axial inner edge. In this manner the goal is attained that the wheel cap or the magnet wheel can be more easily mounted into the snap-in position in which the packing ring is in both circumferential grooves and seals the two parts opposite one another.

Preferably the wheel cap or the magnet wheel overlaps the end section of the wheel hub. This permits an especially simple mounting and dismounting and in the case of the wheel cap an additional cover for the cavity of the wheel hub against the penetration of dirt. However, conversely it is also possible that the wheel cap or the magnet wheel fits into the end section of the wheel hub. Therefore, to assure the snap-on action, the above and following described embodiments of the wheel hub on the one hand and the wheel cap or the magnet wheel on the other hand in their end regions can be redesigned correspondingly or interchanged without further effort, in order to change over from the wheel cap or the wheel magnet overlapping the wheel hub to the wheel cap or the wheel magnet fitting into the wheel hub.

The inner surface of the end section of the wheel cap or the magnet wheel runs outwardly tilted preferably form the inner circumferential groove to the face, forming a small opening angle of e.g. about 15°, to the axial direction. The diameter of the lead-in opening of the wheel cap or the magnet wheel is somewhat larger than the outer diameter of the packing ring on the wheel hub onto which the wheel cap or the magnet wheel are to be put.

If the respective axially outer edge of the one or the other circumferential groove is designed flatter and lower than the axially inner edge, it is especially advantageous for a tight, yet easily dismountable seat of the wheel cap or of the magnet wheel on the end section of the wheel hub, if the axially outer edge forms an angle ranging from about 15° to 45° to the axial direction.

The axially inner edge forms, for example, an angle ranging from about 15° to 45°, preferably about 30°, to the radial direction, whereas the two edges of the circumferential grooves can be at an angle ranging from about 60° to 120°.

Other goals, features, advantages, and application possibilities of the present invention follow from the following description of the embodiments by means of the drawing. All described and/or illustrated features

BRIEF DESCRIPTION OF THE DRAWINGS

FIG. 5 is an enlarged, sectional view of the axially outer end section of a wheel hub specifically for the mounting device of the invention;

FIG. 6 is, in contrast, a reduced sectional view of a magnet wheel for application with a wheel hub according to FIG. 5; and FIG. 7 is an enlarged sectional view of the section Y of the magnet wheel according to FIG. 6.

DESCRIPTION OF THE PREFERRED EMBODIMENTS

Figure 1:
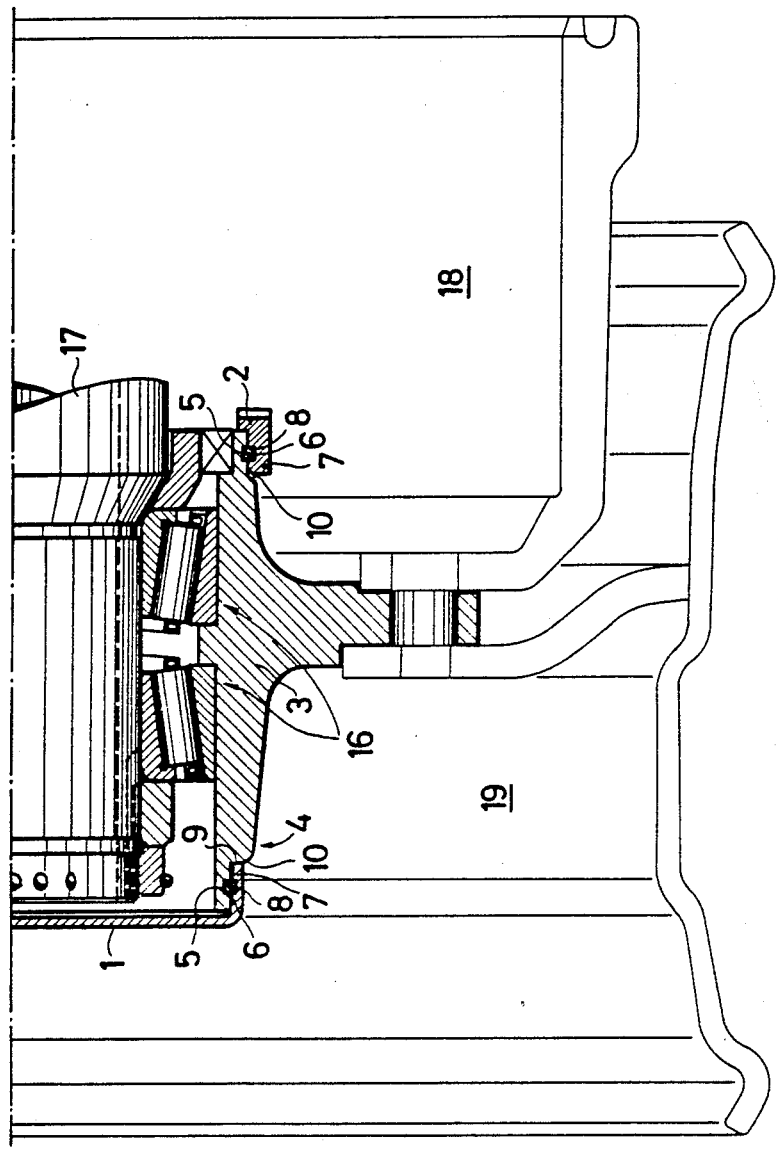
FIG. 1 is a sectional view (upper half deleted) of a mounting device for a wheel cap and for a magnet wheel at a wheel hub in accordance with the invention.

The brake drum 18 and the wheel 19 are firmly screwed by means of an outer flange to the wheel hub 3, according to FIG. 1, which can be rotated by means of at least one wheel bearing 16 on the axle journal of a wheel axle 17. On the one side of the tapered outer end sectins of the wheel hub 3, a wheel cap 1 and on the other side the magnet wheel 2 is held by a mounting device of the invention. For this purpose the wheel cap 1 has an angle-shaped edge flange somewhat vertical from the cap floor. A circumferential groove 8 is arranged in the inside of the end sections 7 on the side of the wheel from both the edge flange of the wheel cap 1 and the magnet wheel 2. A circumferential groove 5 in which packing ring 6 is received respectively is in the outer surface of the end sections 4 of the wheel hub 3. In the drawing of FIG. 1, the wheel cap 1 and the magnet wheel 2 are snapped with their end sections 7 on the end sections 4 of the wheel hub 3 in such a manner that the packing rings 6 are not only in the circumferential grooves 5 but also in the circumferential grooves 8. In this snapped-on state the wheel cap 1 and the magnet wheel 2 abut with the faces 9 of their end sections 7 against the respective outer ring shoulder 10 of the end sections 4 of the wheel hub 3.

Figure 2:
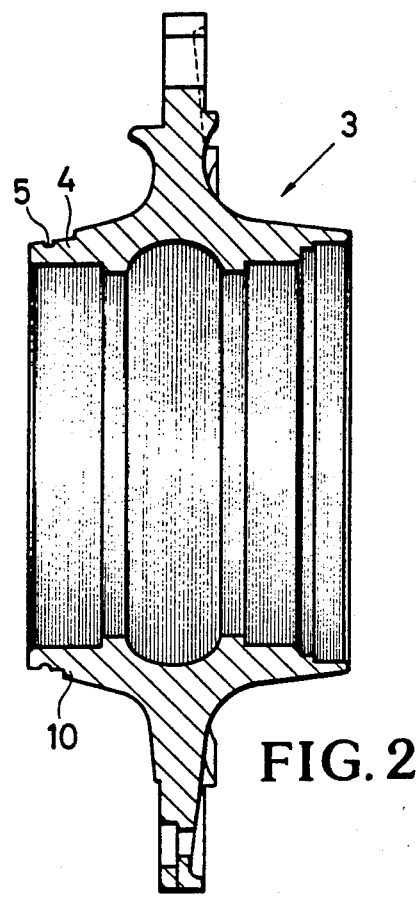
FIG. 2 is a sectional view of another embodiment of a wheel hub designed correspondingly in its axially outer end region for application in conjunction with the mounting device of the invention.

In the embodiment of the wheel hub of FIG. 2, the circumferential groove 5, provided only unilaterally in this example, has a groove root that is essentially symmetrical to the median plane of the groove. The packing ring 6 is permanently received i nthe circumferential groove 5. The end or outer section 4 of hub 3 widens somewhat conically towards the median plane of the wheel hub. Either a wheel cap or a magnet wheel can be put on said end section.

Figure 3:
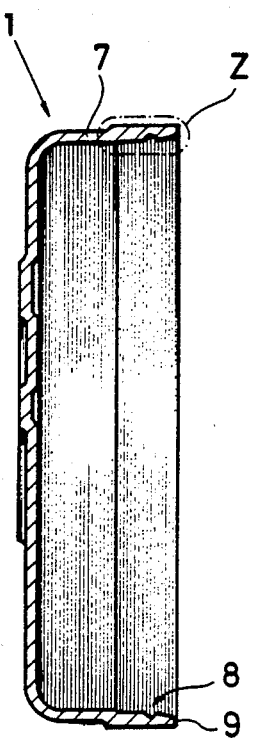
FIG. 3 is a sectional view of a wheel cap, to be used e.g. in interaction with a wheel hub according to FIG. 2 for the application in conjunction with a mounting device of the invention.
Figure 4:
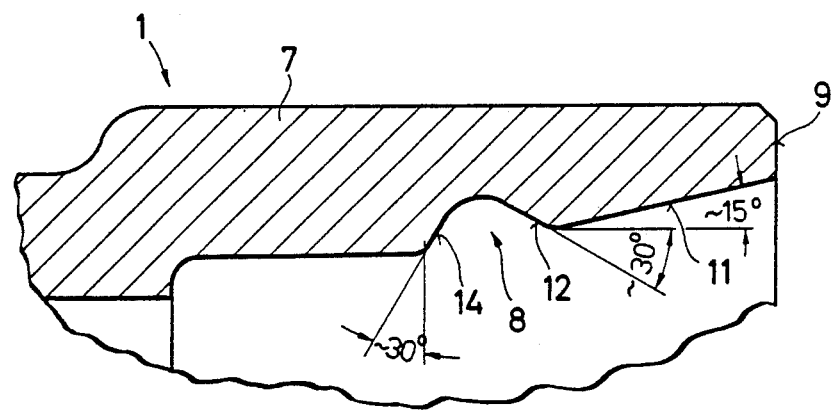
FIG. 4 is an enlarged view of section Z of FIG. 3 in the region of an end section of the wheel cap on the side of the wheel hub.

FIG. 3 illustrates a wheel cap 1, which is to be securely positioned on a wheel hub 3 according to FIG. 2 of the mounting device of the invention. As shown in particular in the enlarged presentation of FIG. 4, the wheel cap 1 has on the inside of its end section 7 a circumferential groove 8, whose axially outer edge 12 forms an angle of e.g. 30° to the axial direction, whereas the axially inner edge 14 is steeper and in particular forms an angle of e.g. 30° to the radial direction. The axially outer edge 12 is also lower than the axially inner edge 14. In this manner the wheel cap 1 with its end section 7 overlapping the end section 4 of the wheel hub 3 can be readily brought into a position in which the packing ring 6 in the circumferential groove 5 of the wheel hub 3 snaps into the inner circumferential groove 8 of the wheel hub 1 so that the wheel cap 1 is held securely on the wheel hub 3 but can also be disconnected. The process of putting the wheel cap 1 on the end section 4 of the wheel hub 3 is facilitated in that the inside 11 of the end section 7 of the wheel cap 1 runs outwardly sloped from the inner circumferential groove 8 to the face 9, forming a small opening angle of e.g. 15° to the axial direction so that the diameter of the lead-in opening of the wheel cap 1 is negligibly larger than the face-sided diameter of the end section 4 of the wheel hub 3 and, if required, negligibly larger than the outer diameter of the packing ring 6; and the inside 11 acts as abutting slope for the packing ring 6 until said ring snaps into the groove 8.

FIG. 5 illustrates another embodiment of the end section 4 of the wheel hub 3 for snapping on a wheel cap 1 or a magnet wheel 2 designated for anti-skid systems according to FIG. 6. In the embodiment according to FIG. 5, the outer circumferential groove 5 of the end section 4 is in such a manner nonsymmetrical that although the axially outer edge 13 does run mirror-symmetrically at about the same angle as the radially inner edge 15 to the radial direction, the edge 13 is lower than the edge 15 so that the packing ring can be readily snapped into the circumferential groove 5 if it is pushed or axially from the outside. In this example the edges 13 and 15 define between themselves an angle of about 60°. The details of the end section 7 of the magnet wheel 2 according to FIG. 6 are designed in accordance with those illustrated in FIG. 7. This end section 7 is similar to the end section 7 of the wheel cap 1 of FIG. 4, whereby the axially outer edge 12, however, is not as flat as the outer edge of fIG. 4, namely in this example forming an angle of about 45° to the axial direction. In this manner the tight seating of the magnet ring 2 on the wheel hub 3 of FIG. 5 is further improved.

List of reference numbers:
1: wheel cap
2: magnet wheel
3: wheel hub
4: outer end section
5: circumferential groove
6: packing ring
7: end section on the side of the wheel hub
8: circumferential groove
9: face
10: shoulder
11: inside surface
12: outer edge
13: outer edge
14: inner edge
15: inner edge
16: wheel bearing
17: wheel axle
18: brake drum
19: wheel

I claim:

1. A mounting device for mounting at least one of a wheel cap and a magnet wheel for sensing anti-skid systems on a wheel hub of a vehicle, said mounting device comprising:

a wheel hub having a first and a second end, means defined on said first end for attaching a vehicle wheel and for attaching a wheel cap, means defined on said second end for attaching a vehicle brake means, and a circumferential groove defined in an outer peripheral surface of at least one of said first and second ends of said wheel hub for receiving a packing ring therein, said circumferential groove having a groove root substantially symmetrical to a median plane of said circumferential groove, said circumferential groove defined in said outer peripheral surface of said at least one of said first and second ends further defining first and second portions of said outer peripheral surface, said first portion being disposed outwardly of said circumferential groove and said second portion being disposed inwardly of said circumferential groove, said first portion defining a first circumferential outer edge of said groove and said second portion defining a second circumferential inner edge of said groove, and a diameter of said first circumferential outer edge being greater than a diameter of said second circumferential inner edge of said groove;

a wheel cap mounted on and partially overlapping said first end of said wheel hub, said wheel cap having inner and outer peripheral surfaces, a circumferential groove defined in said inner peripheral surface of said wheel cap for receiving a packing ring therein and for being disposed adjacent to said circumferential groove in said first end of said wheel hub when said wheel cap is mounted thereon, said circumferential groove of said wheel cap having a groove root substantially symmetrical to a median plane of said wheel cap circumferential groove, said wheel cap circumferential groove further defining first and second portions of said inner peripheral surface, said first portion being disposed outwardly of said wheel cap circumferential groove and said second portion being disposed inwardly of said wheel cap circumferential groove, said first portion defining a first circumferential outer edge of said wheel cap groove and said second portion defining a second circumferential inner edge of said wheel cap groove, and a diameter of said first circumferential outer edge of said wheel cap circumferential groove being greater than a diameter of said second circumferential inner edge of said wheel cap circumferential groove, said first portion of said inner peripheral surface of said wheel cap outwardly of said wheel cap circumferential groove being a sloping surface, and said wheel cap sloping surface extending radially outwardly of said wheel cap at an angle of about 15°; and a packing ring received in said circumferential groove in said outer peripheral surface of said at least one of said first and second ends of said wheel hub and in said wheel cap circumferential groove of said wheel cap mounted on said wheel hub for detachably securing said wheel cap on said wheel hub.

2. A mounting device as in claim 1, further comprising a circumferential groove defined in a peripheral surface of said second end of said wheel hub for mating with a circumferential groove of a magnet wheel, said circumferential groove of said second end having a groove root substantially symmetrical to a median plane of said circumferential groove, said circumferential groove defined in said outer peripheral surface of said at least one of said first and second ends further defining first and second portins of said outer peripheral surface, said first portion being disposed outwardly of said circumferential groove and said second portion being disposed inwardly of said circumferential groove, said first portion defining a first circumferential outer edge of said groove and said second portion defining a second circumferential inner edge of said groove, and a diameter of said first circumferential outer edge being greater than a diameter of said second circumferential inner edge of said groove;

a magnet wheel mounted on said second end of said wheel hub, said magnet wheel having inner and outer peripheral surfaces, a circumferential groove defined in said inner peripheral surface of said magnet wheel for receiving a packing ring therein and for being disposed adjacent to said circumferential groove in said second end of said wheel hub when said magnet wheel is mounted thereon, said circumferential groove of said magnet wheel having a groove root substantially symmetrical to a median plane of said magnet wheel circumferential groove, said magnet wheel circumferential groove further defining first and second portions of said inner peripheral surface, said first portion being disposed outwardly of said magnet wheel circumferential groove and said second portion being disposed inwardly of said magnet wheel circumferential groove, said first portion defining a first circumferential outer edge of said magnet wheel groove and said second portion defining a second circumferential inner edge of said magnet wheel groove, and a diameter of said first circumferential outer edge of said magnet wheel circumferential groove being greater than a diameter of said second circumferential inner edge of said magnet wheel circumferential groove, said first portion of said inner peripheral surface of said magnet wheel outwardly of said magnet wheel circumferential groove being a sloping surface, and said magnet wheel sloping surface extending radially outwardly of said magnet wheel at an angle of about 15°; and a packing ring received in said circumferential groove in said outer peripheral surface of said second one of said first and second ends of said wheel hub and in said magnet wheel circumferential groove of said magnet wheel mounted on said wheel hub for detachably securing said magnet wheel on said wheel hub.

3. A mounting device for mounting at least one of a wheel cap and a magnet wheel for sensing anti-skid systems on a wheel hub of a vehicle, said mounting device comprising:

a wheel hub having a first and a second end, means defined on said first end for attaching a vehicle wheel and for attaching a wheel cap, means defined on said second end for attaching a vehicle brake means, and a circumferential groove defined in an outer peripheral surface of at least one of said first and second ends of said wheel hub for receiving a packing ring therein, said circumferential groove having a groove root substantially symmetrical to a median plane of said circumferential groove, said circumferential groove defined in said outer peripheral surface of said at least one of said first and second ends further defining first and second portins of said outer peripheral surface, said first portion being disposed outwardly of said circumferential groove and said second portion being disposed inwardly of said circumferential groove, said first portion defining a first circumferential outer edge of said groove and said second portion defining a second circumferential inner edge of said groove, and a diameter of said first circumferential outer edge being greater than a diameter of said second circumferential inner edge of said groove;

a wheel cap mounted on and partially overlapping said first end of said wheel hub, said wheel cap having inner and outer peripheral surfaces, a circumferential groove defined in said inner peripheral surface of said wheel cap for receiving a packing ring therein and for being disposed adjacent to said circumferential groove in said first end of said wheel hub when said wheel cap is mounted thereon, said circumferential groove of said wheel cap having a groove root substantially symmetrical to a median plane of said wheel cap circumferential groove, said wheel cap circumferential groove further defining first and second portions of said inner peripheral surface, said first portion being disposed outwardly of said wheel cap circumferential groove and said second portion being disposed inwardly of said wheel cap circumferential groove, said first portion defining a first circumferential outer edge of said wheel cap groove and said second portion defining a second circumferential inner edge of said wheel cap groove, and a diameter of said first circumferential outer edge of said wheel cap circumferential groove being greater than a diameter of said second circumferential inner edge of said wheel cap circumferential groove, said first portion of said inner peripheral surface of said wheel cap outwardly of said wheel cap circumferential groove being a sloping surface, and said wheel cap sloping surface extending radially outwardly of said wheel cap at an angle of about 15° to 45° ; and a packing ring received in said circumferential groove in said outer peripheral surface of said at least one of said first and second ends of said wheel hub and in said wheel cap circumferential groove of said wheel cap mounted on said wheel hub for detachably securing said wheel cap on said wheel hub.

4. A mounting device as in claim 3, further comprising a circumferential groove defined in a peripheral surface of said second end of said wheel hub for mating with a circumferential groove of a magnet wheel, said circumferential groove of said second end having a groove root substantially symmetrical to a median plane of said circumferential groove, said circumferential groove defined in said outer peripheral surface of said at least one of said first and second ends further defining first and second portions of said outer peripheral surface, said first portion being disposed outwardly of said circumferential groove and said second portion being disposed inwardly of said circumferential groove, said first portion defining a first circumferential outer edge of said groove and said second portion defining a second circumferential inner edge of said groove, and a diameter of said first circumferential outer edge being greater than a diameter of said second circumferential inner edge of said groove;

a magnet wheel mounted on said second end of said wheel hub, said magnet wheel having inner and outer peripheral surfaces, a circumferential groove defined in said inner peripheral surface of said magnet wheel for receiving a packing ring therein and for being disposed adjacent to said circumferential groove in said second end of said wheel hub when said magnet wheel is mounted thereon, said circumferential groove of said magnet wheel having a groove root substantially symmetrical to a median plane of said magnet wheel circumferential groove, said magnet wheel circumferential groove further defining first and second portions of said inner peripheral surface, said first portion being disposed outwardly of said magnet wheel circumferential groove and said second portion being disposed inwardly of said magnet wheel circumferential groove, said first portion defining a first circumferential outer edge of said magnet wheel groove and said second portion defining a second circumferential inner edge of said magnet wheel groove, and a diameter of said first circumferential outer edge of said magnet wheel circumferential groove being greater than a diameter of said second circumferential inner edge of said magnet wheel circumferential groove, said first portion of said inner peripheral surface of said magnet wheel outwardly of said magnet wheel circumferential groove being a sloping surface, and said magnet wheel sloping surface extending radially outwardly of said magnet wheel at an angle of about 15° ; and a packing ring received in said circumferential groove in said outer peripheral surface of said second one of said first and second ends of said wheel hub and in said magnet wheel circumferential groove of said magnet wheel mounted on said wheel hub for detachably securing said magnet wheel on said wheel hub.

5. A device as in claim 3, wherein said angle is about 30° .

6. A mounting device for mounting at least one of a wheel cap and a magnet wheel for sensing anti-skid systems on a wheel hub of a vehicle, said mounting device comprising:

a wheel hub having a first and a second end, means defined on said first end for attaching a vehicle wheel and for attaching a wheel cap, means defined on said second end for attaching a vehicle brake means, and a circumferential groove defined in an outer peripheral surface of at least one of said first and second ends of said wheel hub for receiving a packing ring therein, said circumferential groove having a groove root substantially symmetrical to a median plane of said circumferential groove, said circumferential groove defined in said outer peripheral surface of said at least one of said first and second ends further defining first and second portions of said outer peripheral surface, said first portion being disposed outwardly of said circumferential groove and said second portion being disposed inwardly of said circumferential groove, said first portion defining a first circumferential outer edge of said groove and said second portion defining a second circumferential inner edge of said groove, and a diameter of said first circumferential outer edge being greater than a diameter of said second circumferential inner edge of said groove;

a wheel cap mounted on and partially overlapping said first end of said wheel hub, said wheel cap having inner and outer peripheral surfaces, a circumferential groove defined in said inner peripheral surface of said wheel cap for receiving a packing ring therein and for being disposed adjacent to said circumferential groove in said first end of said wheel hub when said wheel cap is mounted thereon, said circumferential groove of said wheel cap having a groove root substantially symmetrical to a median plane of said wheel cap circumferential groove, said wheel cap circumferential groove further defining first and second portions of said inner peripheral surface, said first portion being disposed outwardly of said wheel cap circumferential groove and said second portion being disposed inwardly of said wheel cap circumferential groove, said first portion defining a first circumferential outer edge of said wheel cap groove and said second portion defining a second circumferential inner edge of said wheel cap groove, and a diameter of said first circumferential outer edge of said wheel cap circumferential groove being greater than a diameter of said second circumferential inner edge of said wheel cap circumferential groove, said first portion of said inner peripheral surface of said wheel cap outwardly of said wheel cap circumferential groove being a sloping surface, and said wheel cap sloping surface extending radially outwardly of said wheel cap at an angle of about 0° to 15° and a contained angle defined by said wheel cap circumferential groove is about 60° to 120°; and a packing ring received in said circumferential groove in said outer peripheral surface of said at least one of said first and second ends of said wheel hub and in said wheel cap circumferential groove of said wheel cap mounted on said wheel hub for detachably securing said wheel cap on said wheel hub.

7. A mounting device as in claim 6, further comprising a circumferential groove defined in a peripheral surface of said second end of said wheel hub for mating with a circumferential groove of a magnet wheel, said circumferential groove of said second end having a groove root substantially symmetrical to a median plane of said circumferential groove, said circumferential groove defined in said outer peripheral surface of said at least one of said first and second ends further defining first and second portions of said outer peripheral surface, said first portion being disposed outwardly of said circumferential groove and said second portion being disposed inwardly of said circumferential groove, said first portion defining a first circumferential outer edge of said groove and said second portion defining a second circumferential inner edge of said groove, and a diameter of said first circumferential outer edge being greater than a diameter of said second circumferential inner edge of said groove;

a magnet wheel mounted on said second end of said wheel hub, said magnet wheel having inner and outer peripheral surfaces, a circumferential groove defined in said inner peripheral surface of said magnet wheel for receiving a packing ring therein and for being disposed adjacent to said circumferential groove in said second end of said wheel hub when said magnet wheel is mounted thereon, said circumferential groove of said magnet wheel having a groove root substantially symmetrical to a median plane of said magnet wheel circumferential groove, said magnet wheel circumferential groove further defining first and second portions of said inner peripheral surface, said first portion being disposed outwardly of said magnet wheel circumferential groove and said second portion being disposed inwardly of said magnet wheel circumferential groove, said first portion defining a first circumferential outer edge of said magnet wheel groove and said second portion defining a second circumferential inner edge of said magnet wheel groove, and a diameter of said first circumferential outer edge of said magnet wheel circumferential groove being greater than a diameter of said second circumferential inner edge of said magnet wheel circumferential groove, said first portion of said inner peripheral surface of said magnet wheel outwardly of said magnet wheel circumferential groove being a sloping surface, and said magnet wheel sloping surface extending radially outwardly of said magnet wheel at an angle of about 15°; and a packing ring received in said circumferential groove in said outer peripheral surface of said second one of said first and second ends of said wheel hub and in said magnet wheel circumferential groove of said magnet wheel mounted on said wheel hub for detachably securing said magnet wheel on said wheel hub.

* * * * *